(12) United States Patent
Jiang et al.

(10) Patent No.: US 11,689,662 B2
(45) Date of Patent: Jun. 27, 2023

(54) SYSTEM AND METHOD FOR PROVIDING PERSONALIZED CONTEXT

(71) Applicant: GENESYS TELECOMMUNICATIONS LABORATORIES, INC., Daly City, CA (US)

(72) Inventors: John Bohan Jiang, Markham (CA); Clive John-Chuan, Markham (CA); William Zhao, Markham (CA); Robert J. Culbert, Markham (CA); Colin Kum-Teng Hung, Markham (CA)

( * ) Notice: Subject to any disclaimer, the term of this patent is extended or adjusted under 35 U.S.C. 154(b) by 0 days.

(21) Appl. No.: 17/519,328

(22) Filed: Nov. 4, 2021

(65) Prior Publication Data

US 2022/0141337 A1    May 5, 2022

Related U.S. Application Data

(60) Provisional application No. 63/109,413, filed on Nov. 4, 2020.

(51) Int. Cl.
*H04M 3/51* (2006.01)
*H04M 1/72436* (2021.01)
(Continued)

(52) U.S. Cl.
CPC ..... *H04M 3/5191* (2013.01); *H04M 1/72436* (2021.01); *H04M 1/72454* (2021.01);
(Continued)

(58) Field of Classification Search
CPC ........... H04M 3/5191; H04M 1/72436; H04M 1/72454; H04M 3/42221; H04M 3/5231;
(Continued)

(56) References Cited

U.S. PATENT DOCUMENTS 9,762,733 B1 * 9/2017 Ramanujaiaha ..... H04M 3/5183
10,194,005 B2 * 1/2019 Virieux ................... H04L 61/00
(Continued)

FOREIGN PATENT DOCUMENTS

| CN | 111343185 A | 6/2020 |
| EP | 2285063 A1 | 2/2011 |
| WO | 20210138327 A1 | 7/2021 |

OTHER PUBLICATIONS

International Search Report and Written Opinion regarding co-pending PCT application No. PCT/US2021/058128 dated Feb. 22, 2022.
(Continued)

*Primary Examiner* — Lisa Hashem

(57) ABSTRACT

A system including a mobile application on a user's mobile device for connecting to a plurality of contact centers and providing personalized context to the user. The system includes: the mobile application; a connection from the mobile application to a central API service, wherein the central API service provides authentication tokens to the mobile application for facilitating interaction therebetween; a plurality of vendors which the user has associated with their profile and have been integrated with the central API service, wherein the vendors are operably connected with the central API service for information sharing; and a plurality of media channels connecting the plurality of vendors with the central API service, allowing the user to: view personalized context from past interactions between the user and the plurality of contact centers through the mobile application; and connect with the contact centers.

14 Claims, 4 Drawing Sheets

(51) Int. Cl.
  *H04M 1/72454* (2021.01)
  *H04M 3/42* (2006.01)
  *H04M 3/523* (2006.01)
  *H04W 12/06* (2021.01)

(52) U.S. Cl.
  CPC ..... *H04M 3/42221* (2013.01); *H04M 3/5231* (2013.01); *H04W 12/06* (2013.01); *H04M 2201/40* (2013.01)

(58) Field of Classification Search
  CPC .......... H04M 2201/40; H04M 7/0012; H04M 2203/406; H04M 3/5183; H04W 12/06; H04L 67/02; H04L 67/125; H04L 67/535; H04L 67/562; H04L 63/102; H04L 63/0807; H04L 67/306; H04L 67/53
  See application file for complete search history.

(56) References Cited

U.S. PATENT DOCUMENTS

| | | | | |
|---|---|---|---|---|
| 11,089,465 B2* | 8/2021 | Hunt, III | ............ | H04M 1/72421 |
| 11,301,908 B2* | 4/2022 | Batcha | ................ | H04L 12/1822 |
| 11,410,099 B2* | 8/2022 | Ingram | ................ | G06Q 10/107 |
| 11,423,448 B2* | 8/2022 | Udupa | ................ | G06Q 30/0239 |
| 11,425,059 B2* | 8/2022 | Joshi | ........................ | H04L 41/20 |
| 2014/0270108 A1 | 9/2014 | Riahi et al. | | |
| 2016/0171611 A1 | 6/2016 | Sheng et al. | | |
| 2019/0037077 A1 | 1/2019 | Konig et al. | | |
| 2020/0153761 A1* | 5/2020 | Karp | ..................... | G06F 40/295 |
| 2020/0364067 A1* | 11/2020 | Accame | .............. | G06F 9/44557 |
| 2021/0342203 A1* | 11/2021 | Bolton | ....................... | G06F 9/54 |
| 2022/0141337 A1* | 5/2022 | Jiang | ....................... | H04L 67/53 379/265.09 |
| 2022/0156653 A1* | 5/2022 | Abelow | .................. | G06Q 10/10 |
| 2022/0159419 A1* | 5/2022 | Frolovichev | ........... | H04H 20/95 |
| 2022/0358902 A1* | 11/2022 | Zavesky | .............. | G10H 1/0058 |

OTHER PUBLICATIONS

Dors Nathan et al., "Shibboleth Service Provider Registry Overview", University of Washington, Retried from the Internet: https://wiki.cac.washington.edu/display/infra/Shibboleth+Service+Provider+Registry+Overview.

Scavo, T. et al., "Shibboleth Architecture", Internet Citation, Jun. 8, 2005, pp. 1-32, XP002726066, Retrieved from the internet: http://open-systems.ufl.edu/files/draft-mace-shibboleth-tech-overview-latest.pdf.

* cited by examiner

SYSTEM AND METHOD FOR PROVIDING PERSONALIZED CONTEXT

CROSS REFERENCE TO RELATED APPLICATION

This application claims the benefit of U.S. Provisional Patent Application No. 63/109,413, titled "SYSTEM AND METHOD FOR PROVIDING PERSONALIZED CONTEXT", filed in the U.S. Patent and Trademark Office on Nov. 4, 2020, the contents of which are incorporated herein.

BACKGROUND

The present invention generally relates to telecommunications systems in the field of customer relations management including customer assistance via call or contact centers and internet-based service options. More particularly, but not by way of limitation, the present invention pertains to systems and methods for providing personalized context, including personalized services offered to customers through functionality enabled via an application executed on a mobile computing device and a cloud-based platform.

BRIEF DESCRIPTION OF THE INVENTION

The present invention includes a system including a mobile application operating on a mobile device of a user for connecting the mobile device to a plurality of contact centers and providing personalized context to the user from past interactions with the plurality of contact centers. The system may include: the mobile application operating on the mobile device; a connection from the mobile application to a central API service, wherein the central API service provides authentication tokens to the mobile application for facilitating further interaction between the mobile application and the central API service; a plurality of vendors which the user has associated with their profile and have been integrated with the central API service, wherein the plurality of vendors is operably connected with the central API service for information sharing; and a plurality of media channels operatively connecting the plurality of vendors with the central API service, allowing the user to: view personalized context from past interactions associated with the plurality of contact centers associated with the plurality of vendors through the mobile application; and connect with the plurality of contact centers.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
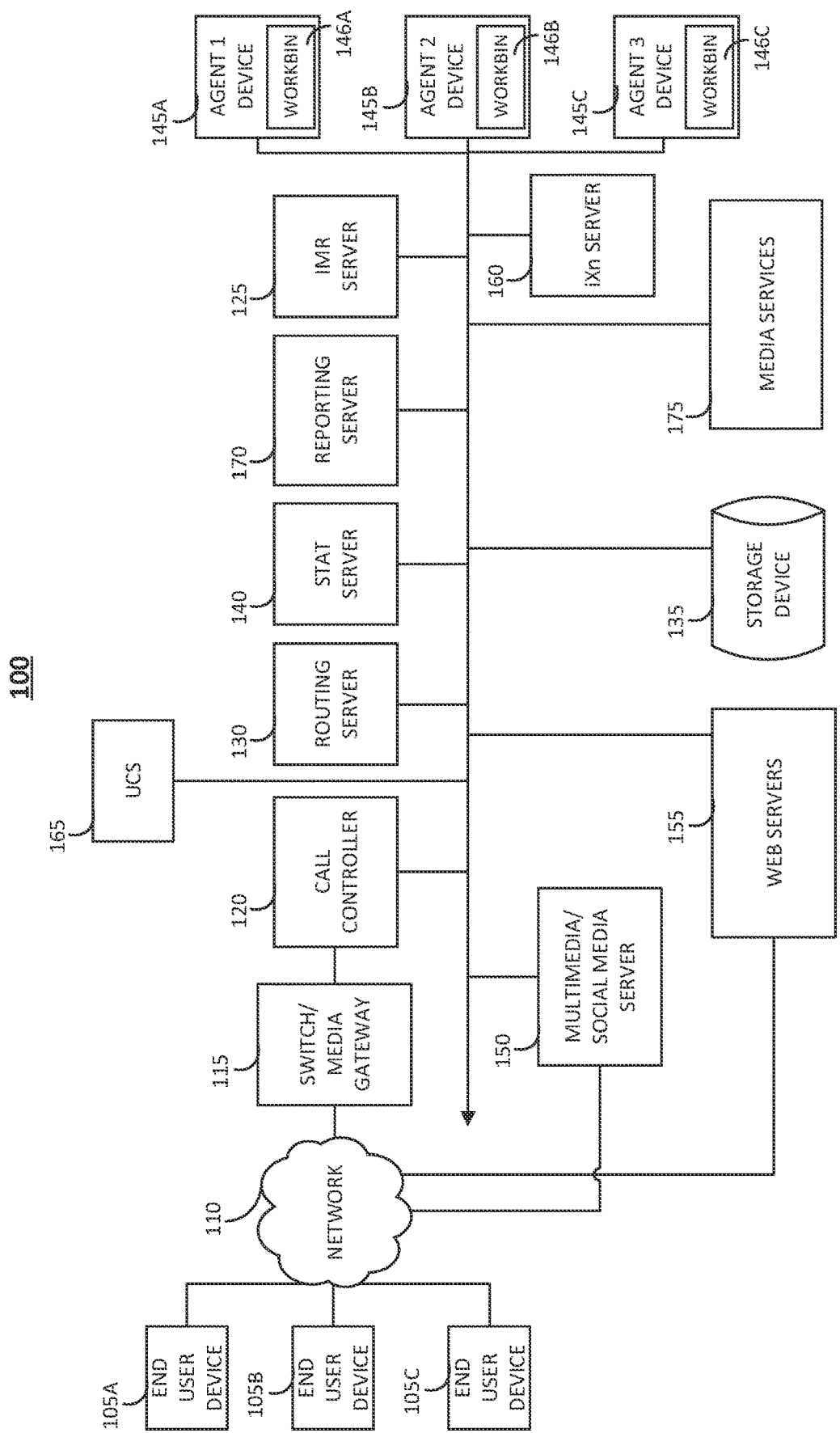
FIG. 1 depicts a schematic block diagram of a communications infrastructure or contact center in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through user interfaces (UIs) present on the agent devices 145A-C. Within the premises-based platform product, the graphical application generator program may be integrated which allows a user to write the programs (handlers) that control various interaction processing behaviors within the premises-based platform product. As noted above, the contact center may operate as a hybrid system in which some or all components are hosted remotely, such as in a cloud-based environment. For the sake of convenience, aspects of embodiments of the present invention will be described below with respect to providing modular tools from a cloud-based environment to components housed on-premises.

Figure 2:
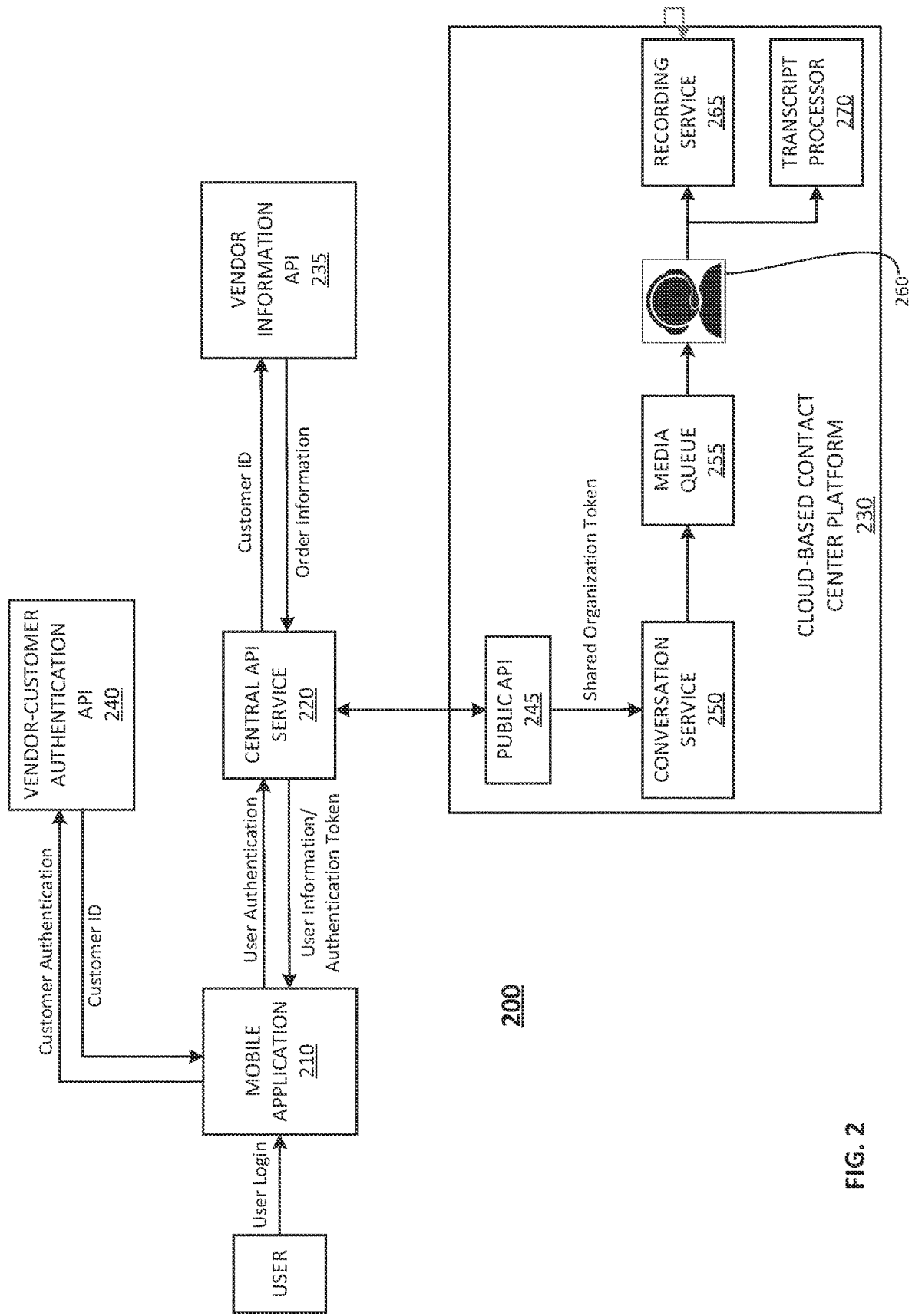
FIG. 2 is a system for providing personalized context in accordance with an embodiment of the present invention.

By way of background—and with generally reference now to FIG. 2—it will be appreciated that customers often waste a significant amount of time trying to connect to an organization's or business's customer support, for example, which may be provided in relation to a contact center such as that shown in FIG. 1. First, contact information for reaching customer support for various businesses are located in different or difficult to reach places. Customers become frustrated with trying to find contact information for customer support. Agents become frustrated when dealing with these customers. Currently, there is no convenient way to contact the Customer Support of multiple businesses for things like a refund, order status, or account status. Thus, it would also be beneficial if an interface was available on the mobile devices of customer for conveniently orchestrating access for users (i.e., customers) to the customer support of many businesses. Furthermore, when Customers finally do reach customer support, the customer service agents (or simply "agents") often lack contextual information related to the interaction, which wastes valuable time verifying things that the customer already knows and which the business should know. A system or application that provides personalized context to the agents would enable an improved customer experience.

With specific reference to FIG. 2, as part of the present disclosure, a system 200 is provided in which a mobile application 210 assists users with customer service in ways that address the above-described issues. The mobile application 210 provides interfaces on a display of a user device, such as a smart phone, that orchestrates connection, authentication, and interaction with a backend central API service 220 (or "central API service 220") 220. The central API service 220 connects to a cloud-based contact center platform (or simply "contact center platform") 230 to orchestrate providing several services to the user. Also included in the system 200 is a vendor information API 235 that communicates with the central API service 220 and, as will be seen, may be used to retrieve customer order information for the user. Also, a vendor-customer authentication API 240 is provided for authenticating users as customers in relation to particular vendors. Additionally, the contact center platform 230 is accessible by the central API service 220 via a public API 245. The contact center platform 230 may further include a conversation service 250, a media queue 255, agent resources 260, and data collectors, such as a recording service 265 and transcript processor 270, each of which collects data from interactions between the user and agents and made available to the user and agents at subsequent interactions to provide context.

As discussed more below, according to embodiments, the user is able to efficiently contact customer support of vendors as provided via the contact center platform 230 from the mobile application 210. This may include chat or voice interactions. In this way, the user can connect with a customer support agent representing a particular business or vendor. Additionally, agents are able to leverage the authentication process to quickly identify a user's profile and other contextual information, such as past orders or transcripts from past interactions. Users are able to schedule a callback either directly or within the context of a previous order to create a more personalized customer experience. Users are able to quickly check all of their previous interaction history in one place. Such interaction history may include full transcripts of all of a user's chat and voice interactions. Accordingly, as will be seen, aspects of the present disclosure may enhance personalization provided to customers and improve overall engagement therewith.

In accordance with exemplary embodiments, the present system 200 may orchestrate registering an account with the mobile application 210 and logging-in to that account. That is, a user may initiate services by registering an account via the mobile application 210. The mobile application 210 may be provided and reached through a mobile device of the user, such as a smart phone. Once registered, the user logs-in to use the mobile application 210. For example, on the mobile application 210, the user creates a new account and, once created, the user then enters credentials to log-in with the central API service 220. The central API service 220 then sends an authentication token to the mobile application 210. The mobile application 210 then may save the authentication token and employ the token to authenticate the user in all subsequent interactions and communications with the central API service 220.

In accordance with exemplary embodiments, the present system 200 may orchestrate a user registering for affiliation with vendors that are already integrated into the mobile application 210. Via the mobile application 210, the user may do this via browsing a list of such integrated vendors that is provided to the user via the mobile application 210. Then, using the mobile application 210, the user selects a particular vendor that they are interested in and registers or affiliates that vendor to their profile. This registered affiliation is then maintained via the mobile application 210, with the mobile application 210 recognizing this affiliation until such time that the user decides to end it.

In accordance with exemplary embodiments, the present system 200 may orchestrate vendors becoming integrated into the mobile application 210. By doing this, the vendors become available to users (i.e., the user can choose to become affiliated with the vendors). This integration process may include the vendor registering with and providing information to the central API service 220. The central API service 220 then maps the vendor to an organization ID, queue ID, and an API access token, which is used in relation to services provide by the contact center platform. For order history, the vendor may further provide the central API service 220 with a vendor admin token for authentication.

In accordance with exemplary embodiments, the present system 200 may orchestrate the user requesting and receiving an order history in relation to one of the vendors affiliated with their account. In such cases, the user will have already registered with the vendor as described above. Then, via the mobile application 210, the user selects or indicates a desire to see their order history with the particular vendor. The mobile application 210 may then connect to the vendor-customer authentication API 240 and provide authentication information related to the vendor. In return, the mobile application 210 receives a customer ID for the user from the vendor-customer authentication API 240. The mobile application 210 then connects to the central API service 220 and requests the order history in relation to the particular vendor given the customer ID. The central API service 220 then connects to the vendor information API 235 for retrieving the order information. The central API service 220 may provide the customer ID and a vendor identifier to the vendor information API 235. For authentication purposes, the central API service 220 also may provide the vendor admin token. Given this information, the vendor information API 235 retrieves the order history for the user and communicates it to the central API service 220, which in turn sends it to the mobile application 210 and provided to the user.

In accordance with exemplary embodiments, the present system 200 may orchestrate a request by the user to communicate with customer support for a vendor. For example, let's look at a case where the user desires to chat with customer support of a selected vendor. In such an instance, the user can simply initiate the chat by selecting a chat option in relation to the selected vendor that is provided via the mobile application 210. In response to this, the mobile application 210 connects to the central API service 220 and receives chat interaction information related to the selected vendor (as may have been provided and configured as part of the previously discussed integration process associated with the selected vendor). The central API service 220 will return information such as queue ID and API access token related to the vendor to the mobile application 210. Using this received information, the mobile application 210 then initiates the chat interaction with the vendor by connecting to the contact center platform. In embodiments, a cloud chat widget may be used to implement the chat interaction.

In accordance with exemplary embodiments, the present system 200 may orchestrate the user requesting and receiving transcripts of a past chat with a vendor. In such a case, for example, the user may choose to view previous chat interactions with a particular vendor from the mobile application 210. The mobile application 210 connects to the central API service 220 to request the transcripts. The central API service 220 then makes a request to the public API 245 for the transcripts of the chats.

In accordance with exemplary embodiments, the present system 200 may orchestrate a user calling (i.e., having a voice interaction) with a vendor. In such a case, the user chooses a call option in relation to a selected vendor that is provided by the mobile application 210. The mobile application 210 then initiates the call to a phone number corresponding to the vendor (as may be provided in a vendor information card).

In accordance with exemplary embodiments, the present system 200 may orchestrate a user scheduling a call back with a particular vendor. In such a case, the user chooses to schedule a callback with a vendor from the mobile application 210. The user may provide a time for the requested call back. The mobile application 210 then initiates the request to the central API service 220 using information associated with the customer and vendor as well as the preferred callback time. The central API service 220 then initiates the request with the Public API 245 of the contact center platform by providing the vendor API access token and other relevant information and create a conversation (i.e., with conversation service 250) with the required information for a callback. The call back request will be added to the media queue 255 and an agent 260 will initiate the callback at the scheduled time or immediately if the callback time is not specified.

In accordance with exemplary embodiments, the present system 200 may orchestrate the user requesting and receiving a text transcript of a past call with an agent of a vendor. In such a case, the customer chooses to view transcripts of previous call interactions with a particular vendor from the mobile application 210. The mobile application 210 then connects to the central API service 220 and request the transcripts. The central API service 220 then makes a request to the Public API 245 to get the transcripts of the particular calls, such as may have been previously created via the recording service 265 and transcript processor 270.

In accordance with an exemplary application of the above described concepts, a system is provided that includes a mobile application operating on a mobile device of a user for connecting the mobile device to a plurality of contact centers and providing personalized context to the user from past interactions with the plurality of contact centers. The system may include: the mobile application operating on the mobile device; a connection from the mobile application to a central API service, wherein the central API service provides authentication tokens to the mobile application for facilitating further interaction between the mobile application and the central API service; a plurality of vendors which the user has associated with their profile and have been integrated with the central API service, wherein the plurality of vendors is operably connected with the central API service for information sharing; and a plurality of media channels operatively connecting the plurality of vendors with the central API service, allowing the user to: view personalized context from past interactions associated with the plurality of contact centers associated with the plurality of vendors through the mobile application; and connect with the plurality of contact centers.

In exemplary embodiments, the integration may include mapping by the central API service to each vendor with a unique organization identifier, a queue identifier, and an API access token through a cloud-based contact center platform.

In exemplary embodiments, the interaction history sharing includes a request for order history by the user from a first vendor of the plurality of vendors by: connecting, by the mobile application, to an authentication API associated with the first vendor; transmitting authentication information provided by the user to the authentication API of the first vendor; receiving, by the central API service, a vendor access token from the first vendor; receiving, by the mobile application from the authentication API of the first vendor, an identifier of the user; transmitting the request for the order history from the mobile application to the central API service for the user, wherein the request comprises the identifier of the user and a vendor identifier of the first vendor; transmitting, by the central API service to a vendor information API associated with the first vendor, the request for the order history, the vendor access token, and the identifier of the user; and receiving, by the central API service, the order history from the vendor information API associated with the first vendor and transmitting, by the central API service, the received order history to the mobile application for display on the mobile device to the user.

In exemplary embodiments, one of the plurality of media channels is operably connected with the queue identifier, which is returned by the central API service to the mobile application for initiation of an interaction with one of the plurality of vendors using a widget associated with the contact center platform. The interaction may include at least one of: a chat interaction, a call, and a request for a callback. The personalized context may include transcripts of one or more previous voice interactions and/or one or more chat interactions.

Figure 3:
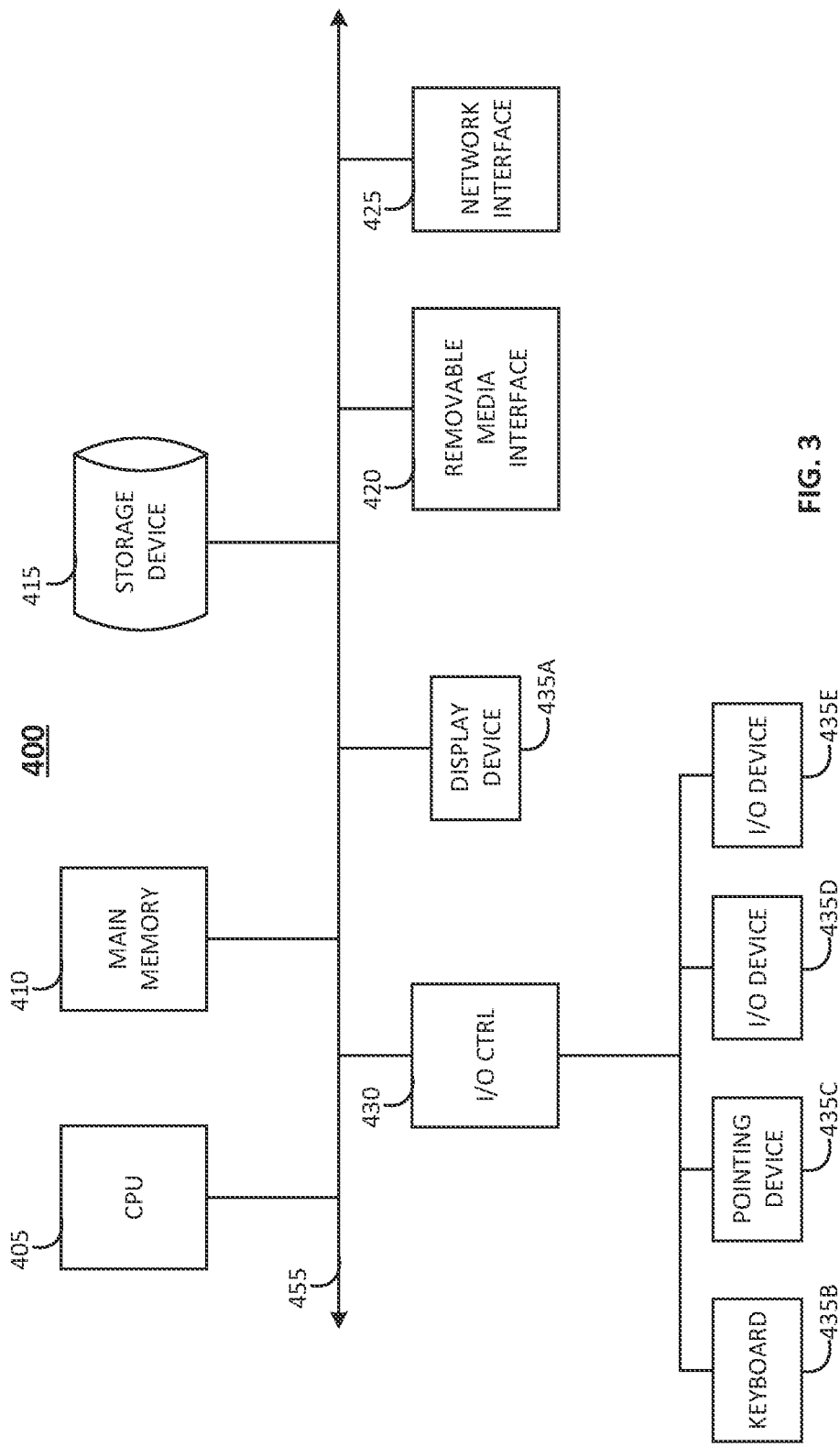
FIG. 3 depicts a schematic block diagram of a computing device in accordance with exemplary embodiments of the present invention and/or with which exemplary embodiments of the present invention may be enabled or practiced.
Figure 4:
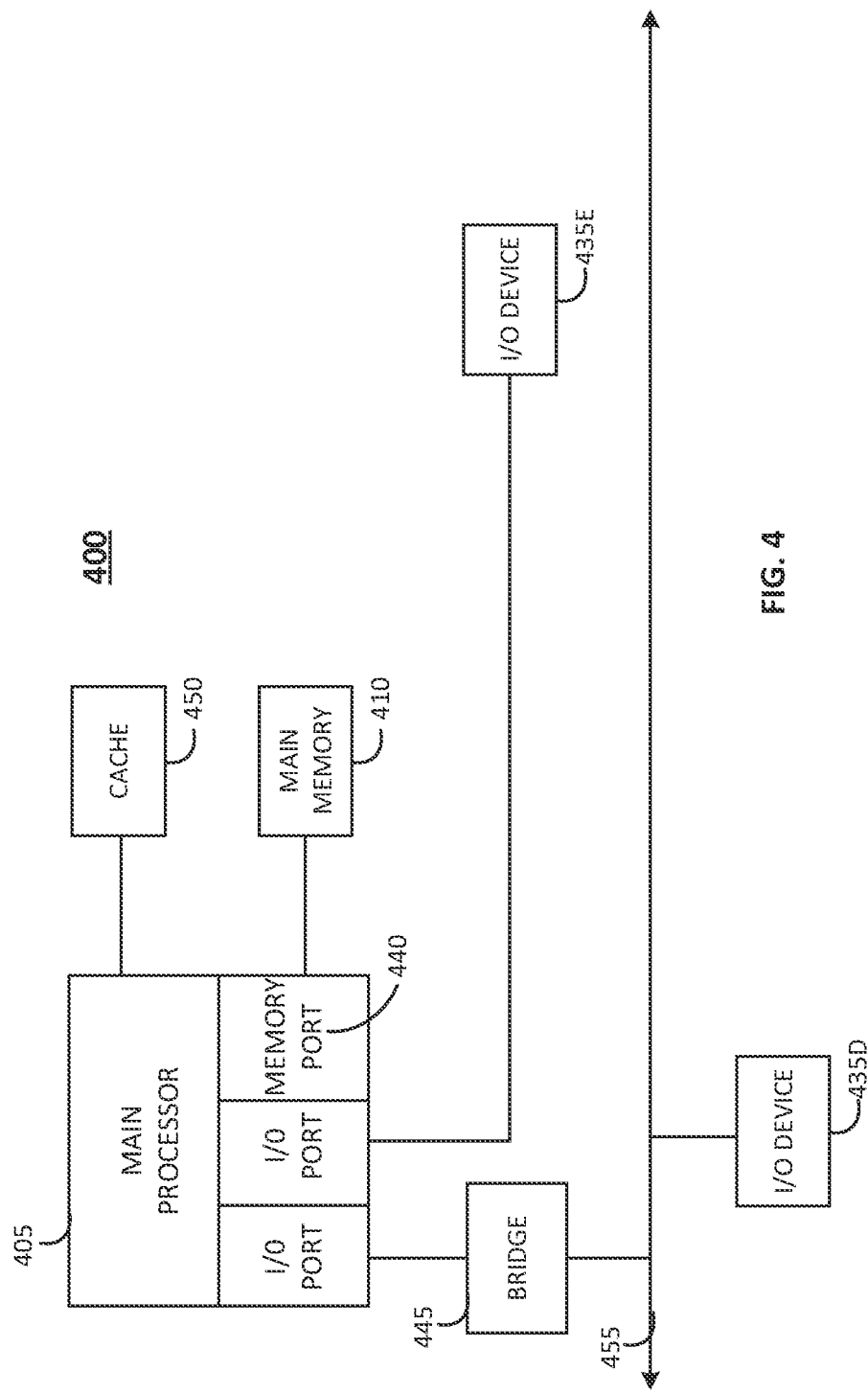
FIG. 4 depicts a schematic block diagram of a computing device in accordance with exemplary embodiments of the present invention and/or with which exemplary embodiments of the present invention may be enabled or practiced.

With reference now to FIGS. 3 and 4, the present invention may include or be embodied in a computer system 400. It will be appreciated that each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 4A, 4B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

FIGS. 3 and 4 are diagrams illustrating an embodiment of a computing device as may be employed in an embodiment of the invention, indicated generally at 400. Each computing device 400 includes a CPU 405 and a main memory unit 410. As illustrated in FIG. 3, the computing device 400 may also include a storage device 415, a removable media interface 420, a network interface 425, an input/output (I/O) controller 430, one or more display devices 435A, a keyboard 435B and a pointing device 435C (e.g., a mouse). The storage device 415 may include, without limitation, storage for an operating system and software. As shown in FIG. 4, each computing device 400 may also include additional optional elements, such as a memory port 440, a bridge 445, one or more additional input/output devices 435D, 435E, and a cache memory 450 in communication with the CPU 405. The input/output devices 435A, 435B, 435C, 435D, and 435E may collectively be referred to herein as 435.

The CPU 405 is any logic circuitry that responds to and processes instructions fetched from the main memory unit 410. It may be implemented, for example, in an integrated circuit, in the form of a microprocessor, microcontroller, or graphics processing unit, or in a field-programmable gate array (FPGA) or application-specific integrated circuit (ASIC). The main memory unit 410 may be one or more memory chips capable of storing data and allowing any storage location to be directly accessed by the central processing unit 405. As shown in FIG. 3, the central processing unit 405 communicates with the main memory 410 via a system bus 455. As shown in FIG. 4, the central processing unit 405 may also communicate directly with the main memory 410 via a memory port 440.

In an embodiment, the CPU 405 may include a plurality of processors and may provide functionality for simultaneous execution of instructions or for simultaneous execution of one instruction on more than one piece of data. In an embodiment, the computing device 400 may include a parallel processor with one or more cores. In an embodiment, the computing device 400 comprises a shared memory parallel device, with multiple processors and/or multiple processor cores, accessing all available memory as a single global address space. In another embodiment, the computing device 400 is a distributed memory parallel device with multiple processors each accessing local memory only. The computing device 400 may have both some memory which is shared and some which may only be accessed by particular processors or subsets of processors. The CPU 405 may include a multicore microprocessor, which combines two or more independent processors into a single package, e.g., into a single integrated circuit (IC). For example, the computing device 400 may include at least one CPU 405 and at least one graphics processing unit.

In an embodiment, a CPU 405 provides single instruction multiple data (SIMD) functionality, e.g., execution of a single instruction simultaneously on multiple pieces of data. In another embodiment, several processors in the CPU 405 may provide functionality for execution of multiple instructions simultaneously on multiple pieces of data (MIMD). The CPU 405 may also use any combination of SIMD and MIMD cores in a single device.

FIG. 4 depicts an embodiment in which the CPU 405 communicates directly with cache memory 450 via a secondary bus, sometimes referred to as a backside bus. In other embodiments, the CPU 405 communicates with the cache memory 450 using the system bus 455. The cache memory 450 typically has a faster response time than main memory 410. As illustrated in FIG. 3, the CPU 405 communicates with various I/O devices 435 via the local system bus 455. Various buses may be used as the local system bus 455, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 435A, the CPU 405 may communicate with the display device 435A through an Advanced Graphics Port (AGP). FIG. 4 depicts an embodiment of a computer 400 in which the CPU 405 communicates directly with I/O device 435E. FIG. 4 also depicts an embodiment in which local buses and direct communication are mixed: the CPU 405 communicates with I/O device 435D using a local system bus 455 while communicating with I/O device 435E directly.

A wide variety of I/O devices 435 may be present in the computing device 400. Input devices include one or more keyboards 435B, mice, trackpads, trackballs, microphones, and drawing tables, to name a few non-limiting examples. Output devices include video display devices 435A, speakers and printers. An I/O controller 430 as shown in FIG. 3, may control the one or more I/O devices, such as a keyboard 435B and a pointing device 435C (e.g., a mouse or optical pen), for example.

Referring again to FIG. 3, the computing device 400 may support one or more removable media interfaces 420, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 435 may be a bridge between the system bus 455 and a removable media interface 420.

The removable media interface 420 may, for example, be used for installing software and programs. The computing device 400 may further include a storage device 415, such as one or more hard disk drives or hard disk drive arrays, for storing an operating system and other related software, and for storing application software programs. Optionally, a removable media interface 420 may also be used as the storage device. For example, the operating system and the software may be run from a bootable medium, for example, a bootable CD.

In an embodiment, the computing device 400 may include or be connected to multiple display devices 435A, which each may be of the same or different type and/or form. As such, any of the I/O devices 435 and/or the I/O controller 430 may include any type and/or form of suitable hardware, software, or combination of hardware and software to support, enable or provide for the connection to, and use of, multiple display devices 435A by the computing device 400. For example, the computing device 400 may include any type and/or form of video adapter, video card, driver, and/or library to interface, communicate, connect or otherwise use the display devices 435A. In an embodiment, a video adapter may include multiple connectors to interface to multiple display devices 435A. In another embodiment, the computing device 400 may include multiple video adapters, with each video adapter connected to one or more of the display devices 435A. In other embodiments, one or more of the display devices 435A may be provided by one or more other computing devices, connected, for example, to the computing device 400 via a network. These embodiments may include any type of software designed and constructed to use the display device of another computing device as a second display device 435A for the computing device 400. One of ordinary skill in the art will recognize and appreciate the various ways and embodiments that a computing device 400 may be configured to have multiple display devices 435A.

An embodiment of a computing device indicated generally in FIGS. 3 and 4 may operate under the control of an operating system, which controls scheduling of tasks and access to system resources. The computing device 400 may be running any operating system, any embedded operating system, any real-time operating system, any open source operation system, any proprietary operating system, any operating systems for mobile computing devices, or any other operating system capable of running on the computing device and performing the operations described herein.

The computing device 400 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 400 may have different processors, operating systems, and input devices consistent with the device.

In other embodiments, the computing device 400 is a mobile device. Examples might include a Java-enabled cellular telephone or personal digital assistant (PDA), a smart phone, a digital audio player, or a portable media player. In an embodiment, the computing device 400 includes a combination of devices, such as a mobile phone combined with a digital audio player or portable media player.

A computing device 400 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 400 communicates with other computing devices 400 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

In an embodiment, the use of LSH to automatically discover carrier audio messages in a large set of pre-connected audio recordings may be applied in the support process of media services for a contact center environment. For example, this can assist with the call analysis process for a contact center and removes the need to have humans listen to a large set of audio recordings to discover new carrier audio messages.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

That which is claimed:

1. A system comprising a mobile application operating on a mobile device of a user for connecting the mobile device to a plurality of contact centers associated with a plurality of respective vendors and providing personalized context, the system comprising:
   the mobile application;
   a connection from the mobile application to a central application programming interface (API) service, wherein the central API service provides authentication tokens to the mobile application for facilitating further interaction between the mobile application and the central API service;
   the plurality of vendors associated by the user with a profile of the user, wherein the contract centers associated with each of the plurality of vendors is integrated with the central API service, the integration comprising mapping by the central API service to each vendor with a unique organization identifier, a queue identifier, and an API access token through a cloud-based contact center platform, wherein the plurality of contact centers is operably connected with the central API service for information sharing; and
   a plurality of media channels operatively connecting the plurality of contact centers with the central API service, allowing the user to:
      view personalized context from past interactions occurring between the user and the plurality of contact centers through the mobile application; and
      connect with the plurality of contact centers;
   wherein the mobile application allows the user to connect with the plurality of contact centers by:
      providing a chat option to the user, the chat option being associated with a given one of the contact centers;
      receiving a selection of the chat option by the user;
      connecting to the central API service and receiving therefrom chat interaction information related to the given one of the contact centers, the chat interaction information comprising the queue identifier and the API access token related to the given one of the contact centers; and
      using the received chat interaction information to connect to the contact center platform for initiating a chat interaction with the given one of the contact centers.

2. The system of claim 1, wherein an interaction history sharing comprises a request for order history by the user from a first vendor of the plurality of vendors by:
   connecting, by the mobile application, to an authentication API associated with the first vendor;
   transmitting authentication information provided by the user to the authentication API of the first vendor;
   receiving, by the central API service, a vendor access token from the first vendor;
   receiving, by the mobile application from the authentication API of the first vendor, an identifier of the user;
   transmitting the request for the order history from the mobile application to the central API service for the user, wherein the request comprises the identifier of the user and a vendor identifier of the first vendor;
   transmitting, by the central API service to a vendor information API associated with the first vendor, the request for the order history, the vendor access token, and the identifier of the user; and
   receiving, by the central API service, the order history from the vendor information API associated with the first vendor and transmitting, by the central API service, the received order history to the mobile application for display on the mobile device to the user.

3. The system of claim 2, wherein one of the plurality of media channels is operably connected with the queue identifier, which is returned by the central API service to the mobile application for initiation of an interaction with one of the plurality of vendors using a widget associated with the contact center platform.

4. The system of claim 3, wherein the interaction comprises at least one of: a chat interaction, a call, and a request for a callback.

5. The system of claim 1, wherein the personalized context comprises transcripts of one or more previous voice interactions.

6. The system of claim 1, wherein the personalized context comprises transcripts of one or more previous chat interactions.

7. The system of claim 1, wherein the user is a customer of one or more of the plurality of vendors.

8. A system comprising:
   a central application programming interface (API) service;
   a mobile application operating on a mobile device of a user, wherein the mobile application is configured to connect, via the central API service, to a plurality of contact centers associated with a plurality of vendors and provide personalized context to the user from past interactions occurring between the user and the plurality of contact centers;

a processor; and a memory in communication with the processor, the memory storing instructions that, when executed by the processor, causes the processor to provide the personalized context by:
  integrating the plurality of vendors for operating in accordance with the central API service;
  interacting with the user via interfaces generated by the mobile application on the mobile device, wherein the interaction with the user comprises enabling the user to create an account and select the plurality of vendors for association with the created account;
  connecting the mobile application to the central API service by the mobile application;
  sending authentication tokens from the central API service to the mobile application for interaction with the central API service, wherein the API service communicates on behalf of the user with the plurality of vendors associated with the account of the user;
  connecting, via a plurality of media channels, the plurality of vendors with the central API service;
  retrieving, in response to a request made by the user, an interaction history associated with one or more of the plurality of vendors;
  displaying to the user on the mobile device the retrieved interaction history, wherein the interaction history includes a transcript of at least one previous interaction between the user and one of the one or more of the plurality of vendors; and
  displaying to an agent of one of the contact centers the retrieved interaction history, wherein the interaction history is displayed to the agent during an interaction with the user to provide context to the agent;
  wherein the integration comprises mapping by the central API service to each vendor with a unique organization identifier, a queue identifier, and an API access token through a cloud-based contact center platform.

9. The system of claim 8, wherein an interaction history sharing comprises a request for order history by the user from a first vendor of the plurality of vendors by:
  connecting, by the mobile application, to an authentication application programming interface (API) associated with the first vendor;
  transmitting authentication information provided by the user to the authentication API of the first vendor;
  receiving, by the central API service, a vendor access token from the first vendor;
  receiving, by the mobile application from the authentication API of the first vendor, an identifier of the user;
  transmitting the request for the order history from the mobile application to the central API service for the user, wherein the request comprises the identifier of the user and a vendor identifier of the first vendor;
  transmitting, by the central API service to a vendor information API associated with the first vendor, the request for the order history, the vendor access token, and the identifier of the user; and
  receiving, by the central API service, the order history from the vendor information API associated with the first vendor and transmitting, by the central API service, the received order history to the mobile application for display on the mobile device to the user.

10. The system of claim 8, wherein the personalized context comprises transcripts of one or more previous voice interactions.

11. The system of claim 8, wherein the personalized context comprises transcripts of one or more previous chat interactions.

12. The system of claim 8, wherein the user is a customer of one or more of the plurality of vendors.

13. A system comprising:
  a central application programming interface (API) service;
  a mobile application operating on a mobile device of a user, wherein the mobile application is configured to connect, via the central API service, to a plurality of contact centers associated with a plurality of vendors and provide personalized context to the user from past interactions occurring between the user and the plurality of contact centers;
  a processor; and
  a memory in communication with the processor, the memory storing instructions that, when executed by the processor, causes the processor to provide the personalized context by:
    integrating the plurality of vendors for operating in accordance with the central API service;
    interacting with the user via interfaces generated by the mobile application on the mobile device, wherein the interaction with the user comprises enabling the user to create an account and select the plurality of vendors for association with the created account;
    connecting the mobile application to the central API service by the mobile application;
    sending authentication tokens from the central API service to the mobile application for interaction with the central API service, wherein the API service communicates on behalf of the user with the plurality of vendors associated with the account of the user;
    connecting, via a plurality of media channels, the plurality of vendors with the central API service;
    retrieving, in response to a request made by the user, an interaction history associated with one or more of the plurality of vendors;
    displaying to the user on the mobile device the retrieved interaction history, wherein the interaction history includes a transcript of at least one previous interaction between the user and one of the one or more of the plurality of vendors; and
    displaying to an agent of one of the contact center the retrieved interaction history, wherein the interaction history is displayed to the agent during an interaction with the user to provide context to the agent;
  wherein the integration comprises mapping by the central API service to each vendor with a unique organization identifier, a queue identifier, and an API access token through a cloud-based contact center platform; and
  wherein one of the plurality of media channels is operably connected with the queue identifier, which is returned by the central API service to the mobile application for initiation of an interaction with one of the plurality of vendors using a widget associated with the contact center platform.

14. The system of claim 13, wherein the interaction comprises at least one of:
  a chat interaction, a call, and a request for a callback.

* * * * *